Sept. 27, 1966  G. L. HARRISON  3,274,856
HYDRAULIC APPARATUS
Filed Oct. 21, 1963  2 Sheets-Sheet 1

INVENTOR
GEOFFREY LINDLEY HARRISON
BY
Reynolds & Christensen
ATTORNEY

Sept. 27, 1966 G. L. HARRISON 3,274,856
HYDRAULIC APPARATUS
Filed Oct. 21, 1963 2 Sheets-Sheet 2

INVENTOR
GEOFFREY LINDLEY HARRISON
BY
Reynolds & Christensen
ATTORNEY

3,274,856
HYDRAULIC APPARATUS
Geoffrey L. Harrison, Scarborough, Ontario, Canada, assignor to Dowty Equipment of Canada Limited, Ajax, Ontario, Canada, a Canadian company
Filed Oct. 21, 1963, Ser. No. 317,537
Claims priority, application Great Britain, Oct. 30, 1962, 41,047/62
4 Claims. (Cl. 74—733)

This invention relates to hydraulic apparatus and more particularly to hydraulic power transmission for transmitting power from a power source to a load, the speed ratio between power source and load being adjustable. The object of the present invention is to provide a combination of hydraulic power transmission and step change mechanical gear box in which adjustment of speed ratio and control of gear engagement in the mechanical gear box is under the control of a single control member.

An infinitely variable speed ratio hydraulic power transmission arranged to transmit power through a gear box having at least two fixed gear ratios includes in accordance with the present invention a single control member movable in one sense to adjust speed ratio of the hydraulic transmission and in another sense to select any of the gears of the mechanical gear box.

Stop means may be provided to prevent operation of the control member in the transmission speed ratio adjusting sense to select low transmission speed ratios other than when the member has been moved in the other sense to select a gear of the gear box having a low speed ratio.

The control member may comprise a lever and the two senses of movement of the lever may comprise angular movements of the lever about two axes at right angles to one another and to the longitudinal axis of the lever.

The invention further comprises an infinitely variable hydrostatic power transmission arranged to transmit power through a gear box having at least two fixed speed ratios including a single control operative on both the transmission and on the gear box wherein the control is movable within a predetermined path or gate having a pair of parallel portions, movement in either of which adjusts speed ratio of the transmission without adjustment of the gear box and a transverse connecting portion between the parallel portions having an inclination thereto, movement through said transverse portions serving to effect change of mechanical gear and to adjust speed ratio of the hydrostatic transmission whereby the speed of the transmission motor approximates to the speed of the load as seen through the speed ratio of the gear box when the latter is engaged following transverse movement of the single control.

Figure 1:
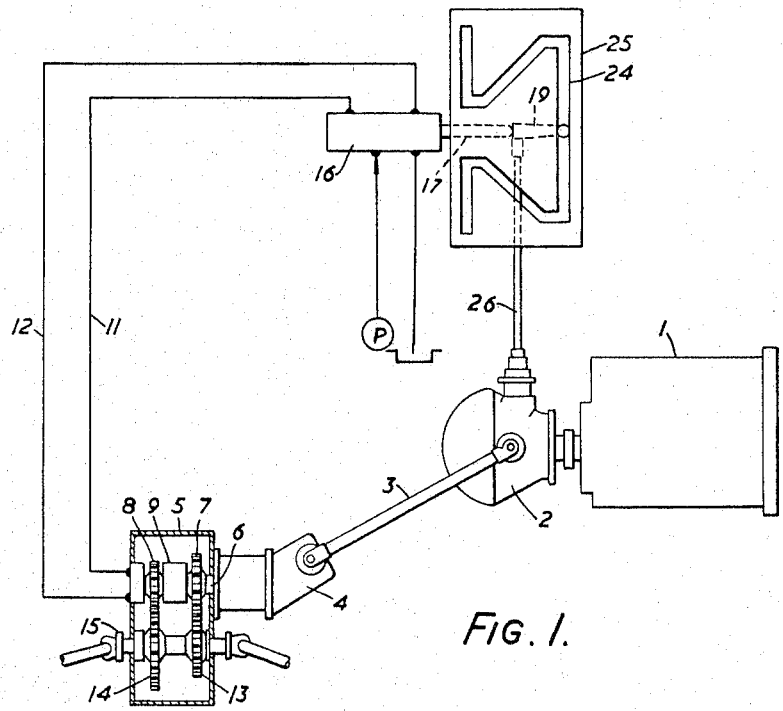
Figure 2:
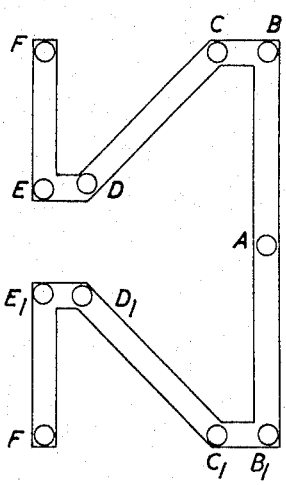
Figure 3:
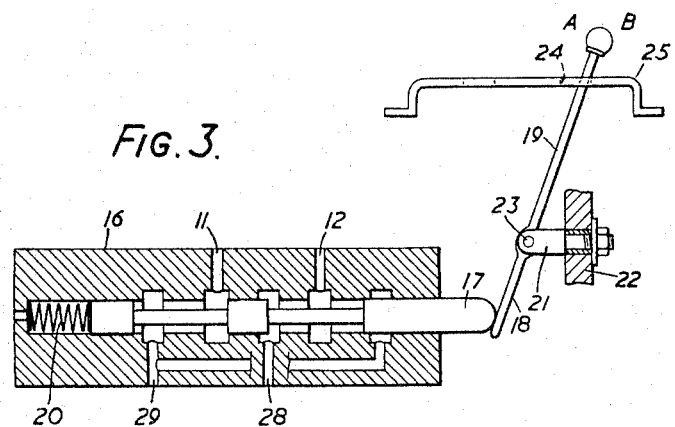
Figure 4:
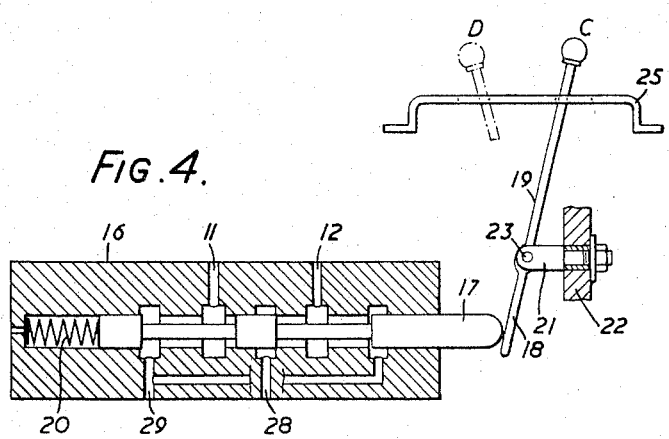
Figure 5:
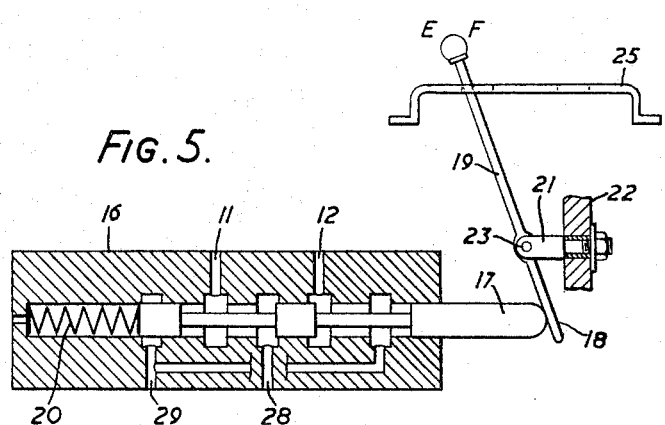

One embodiment of the invention will be described with reference to the accompanying drawings, in which, FIGURE 1 is a diagrammatic illustration of the transmission, FIGURE 2 is an illustration of the control lever gate as used in FIGURE 1, and, FIGURES 3, 4 and 5 are diagrammatic views of the control lever and valve of FIGURE 1 in various operative positions.

This embodiment of the invention is intended for use as a variable speed ratio hydrostatic power transmission for transmitting propulsive power from an engine to the wheels of a vehicle. In FIGURE 1 of the drawings, the engine 1 is connected to drive a reversible variable positive displacement hydraulic pump 2. Hydraulic connections 3 extend from the pump 2 to a fixed positive displacement motor 4. The motor 4 is secured to a mechanical gear box 5 and drives the input shaft 6 of the gear box. The shaft 6 carries a pair of gear wheels 7 and 8 rotatable thereon and alternatively connectable to the shaft by means of a hydraulic clutch 9. The clutch 9 is operable in response to hydraulic pressure supplied through either of the pipes 11 or 12 to cause the wheels 7 or 8 respectively to be engaged with the shaft 6. The gears 7 and 8 are each in constant mesh with a pair of gears respectively 13 and 14 fixedly secured to an output shaft 15.

For control of hydraulic liquid to the pipes 11 and 12 the valve 16 is provided, this valve being shown in more detail in FIGURES 3, 4 and 5. The valve includes a plunger 17 spring loaded outwardly by means of a spring 20, the plunger being capable of occupying either an inner or an outer position to cause pressure liquid to be fed alternatively to the pipe 11 or the pipe 12. The supply of pressure liquid for this purpose is fed into passage 28 of the valve and return flow passes from the passage 29 to a reservoir. The supply of hydraulic pressure may be conveniently obtained from a low pressure make-up pump used to maintain the transmission primed with liquid. The plunger 17 may be caused to occupy one or other positions by engagement with the end 18 of a control lever 19. As shown in FIGURES 3, 4 and 5 the lever 19 is carried by a lug 21 pivotally mounted in a support 22 to be capable of pivotal movement about the longitudinal axis of the lug. The lever 19 is mounted on the lug 21 by means of a pivot pin 23 enabling the lever to move about an axis transverse to the longitudinal axis of the lug 21. The end 18 of the lever 19 is sufficiently large so that over the range of movements of the lever the end 18 will always retain contact with the plunger 17. Movement of the lever 19 about the longitudinal axis of the lug 21 is arranged not to cause endwise movement of the plunger 17. Movement of the lever 19 about the axis of pin 23 will, however, cause substantial movement of the plunger 17. The lever 19 is located for movement in a predetermined manner by its engagement in the slot 24 formed within a gate plate 25. The shape of the slot 24 is illustrated in detail in FIGURE 2. The lever 19 also controls longitudinal displacement of a rod 26 extending into the pump 2, the longitudinal position of this rod determining the displacement of the pump 2. The length of the rod 26 having regard to the pivot axes of the lever 19 in the permitted range of movement is such that longitudinal movement of the rod will occur substantially only on pivotal movement of the lever 19 about the longitudinal axis of the lug 21.

The shape of the slot 24 shown in FIGURE 2 determines the action of the transmission. The slot comprises a plurality of straight portions intersecting one another and for convenience these various portions of the slot will be identified by reference letters placed at the ends of the slot and at the intersections of the straight portions. The central straight portion of the slot B—$B_1$ is so arranged that movement of the lever 19 along this portion causes lever angular movement about the axis of lug 21 thus adjusting the displacement of the pump 2 by means of the rod 26 without moving the plunger 17. At the central position A of this portion B—$B_1$ the rod 26 is positioned to cause pump 2 to assume zero displacement. At this position the pump 2 can deliver no liquid thus locking the motor 4 against movement. In this position the plunger 17 takes up the innermost position, shown in FIGURE 3, in which pressure liquid is supplied to pipe 12 which will cause clutch 9 to engage the gear 8 onto the shaft 6. The transmission of power from the shaft 6 through gears 8 and 14 represents the low speed ratio of the gear box 5. Thus transmission of power through the gears 7 and 13 gives a higher speed ratio within the gear box 5. Thus at the central position A of slot 24 the lowest gear of gear box 5 only may be engaged.

Movement of the lever 19 along the slot from A to B causes increase in pump displacement and thus increase in rotational speed of the shaft 6 relatively to the speed of the pump 2. At position B lever 19 attains a position corresponding to maximum forward displacement of pump 2 which will cause the highest driving speed of the output shaft whilst the low gear of gear box 5 is engaged. For further increase in forward speed the lever 19 is then moved along the slot portion B—C which extends at right angles to the portion B—B₁. Such movement is shown in FIGURE 4 and will permit slight outward movement of the plunger 17 to the extent that hydraulic pressure is cut off from both of the pipes 11 and 12 thus declutching both of the gears 7 and 8 from the shaft 6. The lands of the plunger 17 are so arranged that with the lever in position C both of the pipes 11 and 12 are connected to the return connection 29, the pressure connection 28 being completely closed. The lever is next moved along the straight portion C—D of the slot which is inclined to the portion B—B₁. Movement along this portion causes lever 19 to move simultaneously about the axes of lug 26 and pivot 23 and so simultaneously reduces pump displacement and permits outward movement of plunger 17. At point D the plunger 17 is so adjusted that slight further outward movement will feed pressure liquid to pipe 12 from connection 28. At the same time at point D the displacement of the pump has been reduced in inverse proportion to the change in speed ratio to be effected from the low to the high speed ratio of the gear box 5. For example if the lowest speed ratio of the gear box 5 is 3.5:1 and the high speed ratio is 1:1, movement of the lever 19 along the slot portion C—D will reduce pump displacement in the ratio 1:3.5.

Movement of the lever 19 along the portion D—E will permit outward movement only of the plunger 17 without altering selected pump displacement. This will cause pressure liquid to be supplied to the pipe 12 which in turn will cause clutch 9 to connect gear 7 to shaft 6 whereby the power may be transmitted again to the output shaft 15. Since the displacement of the pump is reduced at point E in inverse proportion to the alteration in speed ratio of the gear box it will be seen that when clutch 9 connects gear 7 to shaft 6, the gear 7 will in effect be rotating at substantially the same speed as the shaft 6, assuming that during the time taken for movement of the lever along the portion C—D the vehicle speed will not have changed substantially. It will be seen that the time taken for movement of the lever 19 along the portion C—D may be extremely small. The portion E—F of the slot extends parallel to the portion B—B₁ and movement of the lever from E to F will move rod 26 to cause increase in pump displacement without altering the position of plunger 17. Thus when lever 19 reaches the position F, pump 2 will have been increased to full displacement. In turn this gives a maximum speed ratio between the shaft 6 and the pump 2, thus ensuring maximum speed ratio between the output shaft 15 and the pump 2.

For propulsion of the vehicle in reverse the lever 19 is moved from the position A toward the position B₁. The functions of the lever 19, pump 2, gear box 5 and valve 16 as the lever successively moves through positions B₁, C₁, D₁ and E₁ to F₁ are the same as described for the positions B, C, D, E and F with the exception that the displacement of the pump is reversed and the vehicle speed will be in reverse.

One of the advantages obtained by this invention lies in the fact that it is not possible to reduce pump displacement below a predetermined value when high gear is selected in the mechanical gear box. This results from the fact that the portions E—D and E₁—D₁ form mechanical stops limiting movement of the lever 19 around the axis of the lug 21 toward the zero displacement position of the pump. This arrangement prevents excessive strain being placed on the whole transmission. A further advantage gained by the invention is that for a particular space to accommodate the control lever 19 it is possible to obtain high sensitivity of control of the lever. This results from the fact that the speed of the vehicle is continuously adjustable over the combined lengths of the slot portions B—B₁, E—F, and E—F₁. The combined lengths of these portions is considerably greater than any one dimension of the space available to accommodate movement of the lever 19.

The two senses of movement of the lever 19 in the described embodiment are angular movements about two axes mutually at right angles to one another and to the longitudinal dimension of the lever itself, i.e. about the axes of the lug 21 and the pivot 23. Within the scope of the invention it will be appreciated that movements in other senses are possible to control the two different functions of selecting transmission speed ratio and selecting mechanical gear. One such movement might comprise rotation of the lever 19 about its own axis or alternatively longitudinal movement of the lever 19. Further within the broad scope of the invention a control member other than a lever may be used.

I claim as my invention:

1. A power transmission comprising a positive displacement pump, a positive displacement motor, hydraulic passage means connecting the pump to the motor, motor speed adjustment means operable on one of the pump and the motor displacements to vary motor speed, a mechanical gearbox, an input shaft for said gearbox driven by the said motor, an output shaft for said gearbox, at least two selectable gears of differing speed ratios engageable within said gearbox between the output and the input shafts, a selector for the gears in the gearbox, a single control operatively connected both to the motor speed adjustment means and to the selector, and a gate locating said control for movement in a predetermined path having a pair of parallel portions corresponding one to low gearbox speed ratio and the other to high gearbox speed ratio, movement in either of which portions adjusts motor speed without adjustment of the gearbox selector, and a transverse connecting portion between the parallel portions having an inclination thereto, movement through said transverse portion serving to move the selector to change mechanical gear and to move the motor speed adjustment means to adjust motor speed inversely in proportion to the proportional change of gear speed ratio, whereby after movement of the control through the said transverse portion, the speed of the output shaft is substantially the same as the speed of the load.

2. A transmission as claimed in claim 1 wherein the parallel portion corresponding to high gear box speed ratio is arranged to prevent selection of transmission speed ratios below a certain value.

3. A transmission as claimed in claim 1 wherein the transverse portion extends from a high transmission speed ratio position of the parallel portion corresponding to low gear box speed ratio to a low transmission speed ratio position of the parallel portion corresponding to high gear box speed ratio.

4. A transmission as claimed in claim 1 wherein the transverse portion extends from the maximum transmission speed ratio position of the parallel portion corresponding to low gear box speed ratio to the parallel portion corresponding to high gear box speed ratio at a position where the transmission speed ratio has a proportion to its maximum value which is the inverse of the proportional change of gear box speed ratio from low to high.

References Cited by the Examiner

UNITED STATES PATENTS

| | | | |
|---|---|---|---|
| 2,893,269 | 7/1959 | Morey et al. | 74—740 |
| 2,920,504 | 1/1960 | Sommer | 74—473 |
| 3,126,763 | 3/1964 | Bowers | 74—733 |

DAVID J. WILLIAMOWSKY, *Primary Examiner.*

H. S. LAYTON, *Assistant Examiner.*